US008653355B2

(12) United States Patent
Fahn et al.

(10) Patent No.: US 8,653,355 B2
(45) Date of Patent: Feb. 18, 2014

(54) CHORD-PLAYING ROBOT SYSTEM AND METHOD FOR CONTROLLING THE SAME

(75) Inventors: Chin-Shyurng Fahn, Taipei (TW); Yung-Wei Lin, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 301 days.

(21) Appl. No.: 13/186,699

(22) Filed: Jul. 20, 2011

(65) Prior Publication Data

US 2012/0165981 A1 Jun. 28, 2012

(30) Foreign Application Priority Data

Dec. 24, 2010 (TW) ................................ 99145917 A (51) Int. Cl.
*G01H 3/00* (2006.01)
(52) U.S. Cl.
USPC ............... 84/743; 901/30; 294/213; 700/245; 84/105
(58) Field of Classification Search
USPC ....... 901/30; 294/213; 700/245; 84/613, 637, 84/743, 105
See application file for complete search history.

(56) References Cited

U.S. PATENT DOCUMENTS

| 4,921,293 | A | * | 5/1990 | Ruoff et al. .................... 294/111 |
| 5,270,480 | A | * | 12/1993 | Hikawa ........................... 84/645 |
| 5,570,920 | A | * | 11/1996 | Crisman et al. ................ 294/111 |
| 6,015,174 | A | * | 1/2000 | Raes et al. ........................ 294/2 |
| 2009/0114054 | A1 | * | 5/2009 | Horiuchi et al. ............ 74/490.05 |
| 2010/0131100 | A1 | * | 5/2010 | Takano .......................... 700/258 |
| 2011/0118871 | A1 | * | 5/2011 | Tsujino et al. ................ 700/245 |

* cited by examiner

*Primary Examiner* — Jeffrey Donels
(74) *Attorney, Agent, or Firm* — Muncy, Geissler, Olds & Lowe, PLLC (57) ABSTRACT

A chord-playing robot system is disclosed. The robot system includes a computer including an anti-collision program, two linear motors, two moving devices, and two finger-like devices. The finger-like devices are respectively connected with the moving devices. The anti-collision program is executed to prevent the moving devices from colliding with each other. The linear motors are controlled by the computer and are operable to drive the moving devices. Each finger-like device includes a plurality of tubular solenoids and a plurality of electromagnetic bars. The tubular solenoids are disposed in alternating sequence in two rows. The computer is operable to determine if there is any one of the tubular solenoids shall be switched on. The at least one tubular solenoid, upon switched on, is configured to move the associated electromagnetic bar toward for pressing a key on a piano.

7 Claims, 5 Drawing Sheets

CHORD-PLAYING ROBOT SYSTEM AND METHOD FOR CONTROLLING THE SAME

BACKGROUND OF THE INVENTION

1. Field of the Invention

The present invention relates to a chord-playing robot system and a method for controlling the robot system.

2. Description of the Related Art

It has been a long time since robots were first developed; however, the functions of current piano playing robot systems are still in comprehensive. Those robots can only press the white keys on the piano or press a single key at a time due to the constraints imposed by the degree of freedom of mechanisms. Therefore, it is necessary to develop a robot system that can press both the black and white keys, as well as playing chords.

Most of the piano-playing robot systems that have been presented so far have only one set of playing devices. Musical pieces, however, are usually composed of a main melody and chords, which are played with both hands on piano. Consequently, there is a need to develop a piano-playing robot system that has two moving parts to mimics the way of a human when playing the piano, namely playing a main melody and chords simultaneously. Moreover, the two moving parts may shift among various intervals without colliding each other.

Thus, in order to provide a robot system capable of playing the main melody and chords on piano at the same time, it is necessary to invent a chord-playing robot system and a method for controlling the same so that the robot system may play complex musical pieces and the two moving parts of the robot system would not collide with each other when the moving parts respectively shift from one interval to another interval.

SUMMARY OF THE INVENTION

It is a main object of the present invention to provide a chord-playing robot system and a method for controlling the robot system. The robot system can simulate the way of a human playing the piano; for example, the robot system may press black keys and/or white keys as commanded, and simultaneously play the main melody and chords.

It is another object of the present invention to provide a chord-playing robot system and a method for controlling the robot system. The robot system can simulate the way of a human playing the piano, and the moving parts of the robot system can shift among different intervals without colliding with each other.

In one aspect, the present invention provides a robot system capable of playing the piano in a way similar to the way a human plays the piano with both hands. The robot system comprises a computer, two linear motors, two moving devices, and two finger-like devices. The computer comprises an anti-collision program. The two linear motors and two finger-like devices are respectively electrically coupled to the computer. The two moving devices are respectively connected with the two linear motors so that the linear motors control the position of the respective moving devices connected therewith. Each of the two finger-like devices comprises a plurality of tubular solenoids which is arranged in alternating sequence in two rows. Each tubular solenoid is configured to reciprocate between a first position for pressing a key on a piano under the presence of the induced electromagnetic force and a second position for leaving the key on the piano under the absence of the induced electromagnetic force. According to one embodiments of the present invention, the two moving devices are respectively driven by the two linear motors under the control of the computer, and the collision between the two moving devices are prevented by executing the anti-collision program. Moreover, the two finger-like devices are also controlled by the computer. In practice, the computer may determine whether or not to activate or switch on a particular tubular solenoid based on the musical pieces to be played, and when the tubular solenoid is switched on, the electromagnetic bar associated with the tubular solenoid would be pushed toward the keyboard (i.e., in the first position) thereby pressing the key underneath the electromagnetic bar. In this way, it is possible for one finger-like device to simultaneously press multiple keys that constitute a chord. In one optional embodiment, one of the finger-like devices plays a main melody of a musical piece, whereas the other finger-like device plays a second melody (such as a melody subordinate to the main melody or a counter melody) or chords of the musical piece. In order to provide a robot system capable of pressing black and white keys simultaneously and/or playing chords composed of multiple notes, each of the finger-like devices preferably has sixteen tubular solenoids. The sixteen tubular solenoids are disposed in alternating sequence in two parallel rows such that each row has eight tubular solenoids. The eight tubular solenoids in one row respectively correspond to eight consecutive white keys on the piano, whereas the other tubular solenoids in the other row are responsible for pressing black keys on the piano. Accordingly, within one finger-like device, the rightmost tubular solenoid (for example, corresponding to the C5 note) and the leftmost tubular solenoid (for example, corresponding to the C4 note) are an octave interval apart. In this way, a single finger-like device may play a chord having two notes five white keys apart (such as, C4 and G4 notes). Moreover, this novel arrangement reduces the frequency required for moving the finger-like horizontally during the performance thereby improving the smoothness of the performance. In another aspect, the present invention further provides a method for controlling the chord-playing robot system described herein. The method comprises:

Step S1: providing a plurality of conversion tables based on a pitch position corresponding to one of the plurality of tubular solenoids;

Step S2: converting each musical note of a music score into a corresponding value of Musical Instrument Digital Interface (MIDI) respectively;

Step S3: dividing each MIDI value by 12 to obtain a remainder thereof; and

Step S4: looking up the remainder within the plurality of conversion tables to determine which of the plurality of tubular solenoids would be switched on.

Preferably, the method may further comprise the following step:

Step S5: determining whether one tubular solenoid within one finger-like device is spaced nine white keys apart from the tubular solenoid located at the same relative position within the other finger-like device.

DETAILED DESCRIPTION OF THE PREFERRED EMBODIMENT

The advantages and innovative features of the invention will become more apparent from the following detailed description when taken in conjunction with the accompanying drawings.

Figure 1:
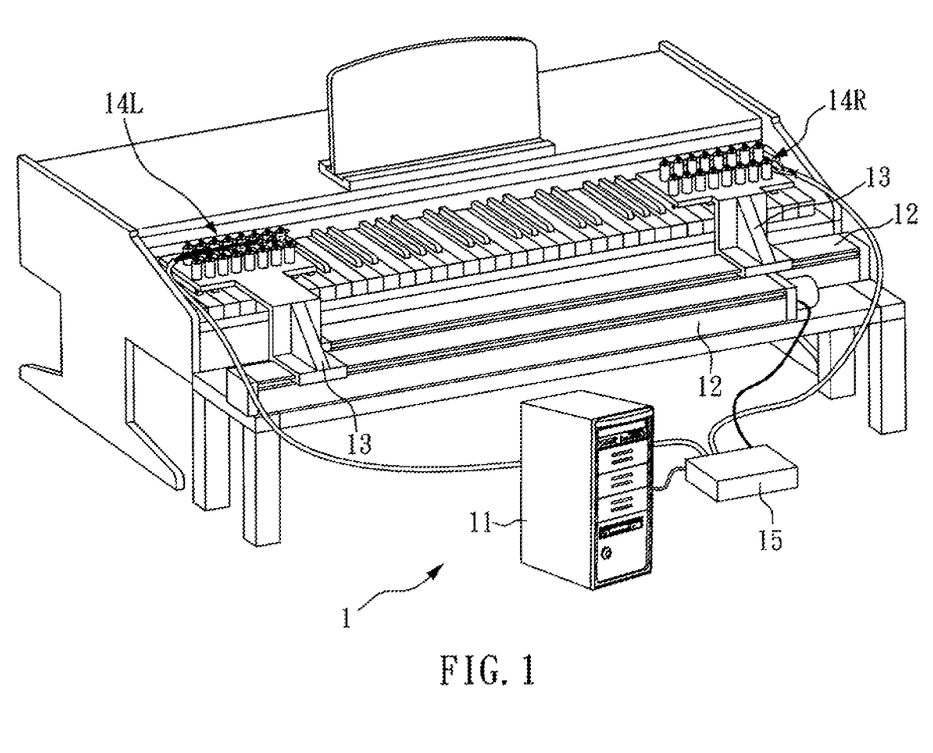
FIG. 1 is a schematic perspective view illustrating a robot system according to the present invention.

Please refer to FIG. 1 first. A chord-playing robot system 1 of the present invention is capable of playing the piano with both hands. As shown in the figure, the robot system 1 comprises a computer 11, two linear motors 12, two moving devices 13, and two finger-like devices 14R, 14L. The computer 11 comprises an anti-collision program. The two linear motors 12 and the two finger-like devices 14R, 14L are respectively electrically coupled to the computer 11. The present invention executes the anti-collision program of the computer 11 to prevent the two moving devices 13 from colliding with each other. The two moving devices 13 respectively are connected with the two linear motors 12 so that the linear motors 12 control the position of the respective moving devices 13 connected therewith. The two linear motors 12 are controlled by the computer 11 to drive the two moving devices 13.

Preferably, the chord-playing robot system 1 further comprises a control circuit 15. The two finger-like devices 14R, 14L are electrically coupled to the computer 11 via the control circuit 15 substantially, which will be described in detail in the following paragraphs.

Each finger-like device 14L or 14R comprises a plurality of tubular solenoids. For the convenience of illustration, for the left or right finger-like device 14L or 14R, the tubular solenoids are denoted by L plus number or R plus number. Take finger-like device 14L for example. Please refer to FIG. 2 and FIG. 3A. Sixteen tubular solenoids L1-L16 are disposed in alternating sequence in two rows; that is, the tubular solenoids L1-L8 are arranged in one row, and the tubular solenoids L9-L16 are arranged in another row. Moreover, the tubular solenoids L1-L8 and the tubular solenoids L9-L16 are actually disposed in alternating sequence in two rows. The tubular solenoids L1-L8 are misaligned with the tubular solenoids L9-L16. Thus, the tubular solenoids L1-L8 serve to press white keys of the piano, and the tubular solenoids L9-L16 serve to press black keys of the piano. As shown in FIG. 3B, right tubular solenoids R1-R16 are disposed in the same way as left tubular solenoids L1-L16, so as to play keys that should be played by a right hand. For example, when the left finger-like device 14L plays a main melody of a musical piece, the right finger-like device 14R can play a second melody (such as a melody subordinate to the main melody or a counter melody) or chords of the musical piece.

Figure 2:
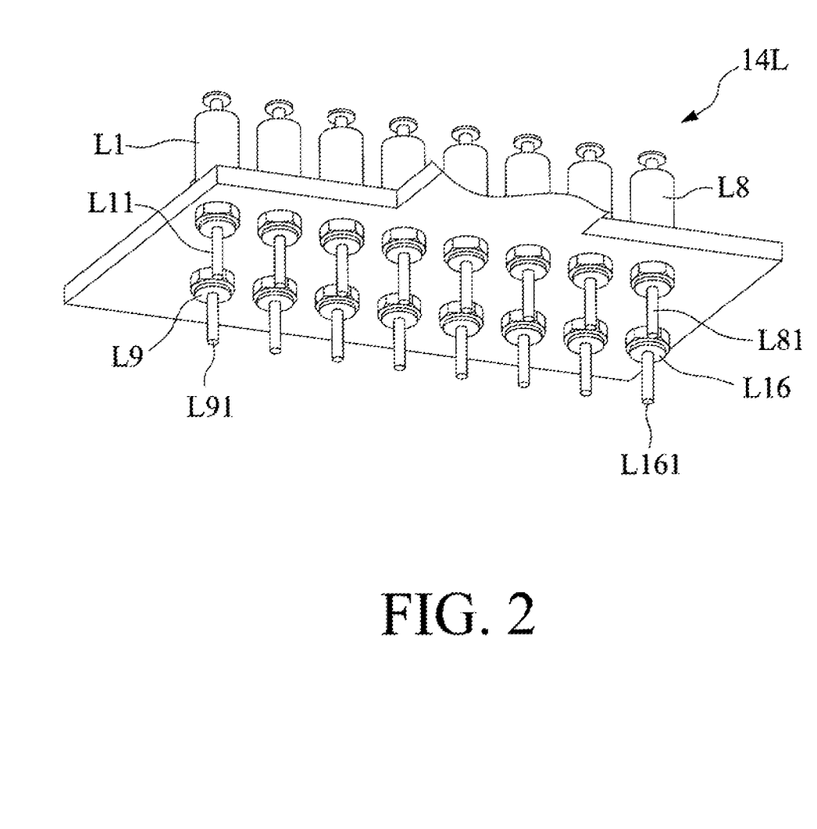
FIG. 2 is a schematic perspective view illustrating of a finger-like device according to the present invention.
Figures 3A, 3B:
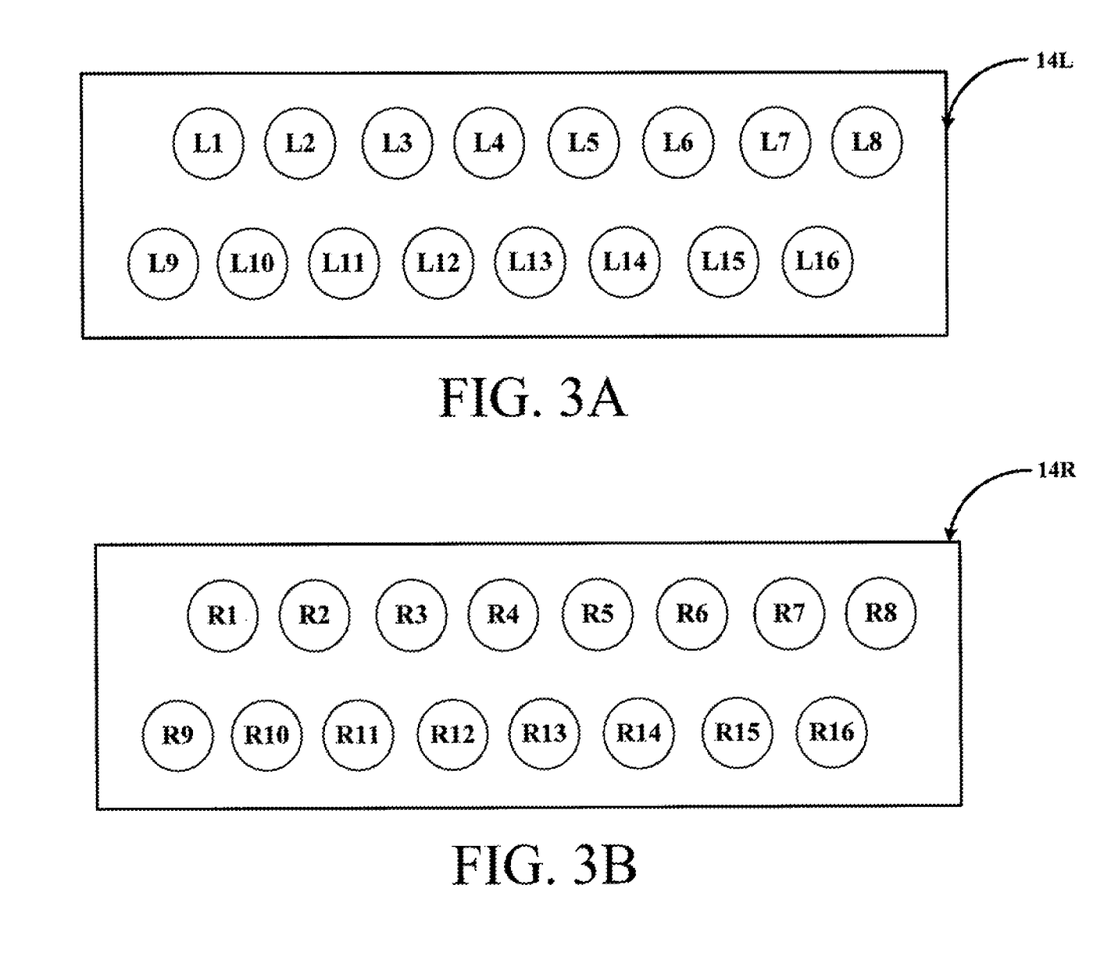
FIG. 3A and FIG. 3B respectively illustrate the dispositions of tubular solenoids within the left and right finger-like devices.

Please refer to FIG. 2. Take left finger-like device 14L for example. Each of the tubular solenoids L1-L16 is configured with one electromagnetic bar L11-L161 respectively so as to reciprocate between a first position for pressing a key on a piano under the presence of the induced electromagnetic force and a second position for leaving the key on the piano under the absence of the induced electromagnetic force. It can be understood that each of the tubular solenoids R1-R16 of the right finger-like device 14R, though not shown in the figures, also is configured with one electromagnetic bar so as to reciprocate between a first position for pressing a key on a piano under the presence of the induced electromagnetic force and a second position for leaving the key on the piano under the absence of the induced electromagnetic force. Please also refer to FIG. 1. The computer 11 controls the two finger-like devices 14L, 14R and determines whether to activate any of the plurality of the tubular solenoids L1-L16 or R1-R16 so as to play a chord. The electromagnetic bars L11-L161 shown in FIG. 2 are in the first position (ie. the tubular solenoids L1-L16 are activated), which are in the state of pressing keys. Because the technique is well known to those of reasonable skill in the art for the tubular solenoids L1-L16, R1-R16 and the electromagnetic bars L11-L161, R11-R161, the detailed description for doing so is omitted.

In order to be able to simultaneously press black keys and white keys and to play a chord, each of the finger-like devices 14R or 14L preferably has sixteen tubular solenoids R1-R16 or L1-L16. The sixteen tubular solenoids R1-R16 or L1-L16 are disposed in alternating sequence in two rows such that each of the two rows has eight tubular solenoids R1-R8, R9-R16 or L1-L8, L9-L16. Thus, the distance between the leftmost tubular solenoid L1 or L9 of each finger-like device (e.g., 14L) and the rightmost tubular solenoid L8 or L16 is an octave. This solves the problem of the finger-like device being unable to play a chord when the distance between two musical notes of the chord is more than five keys. Moreover, this reduces the moving frequency of the moving devices 13 and makes the piano playing smoother.

Figure 4:
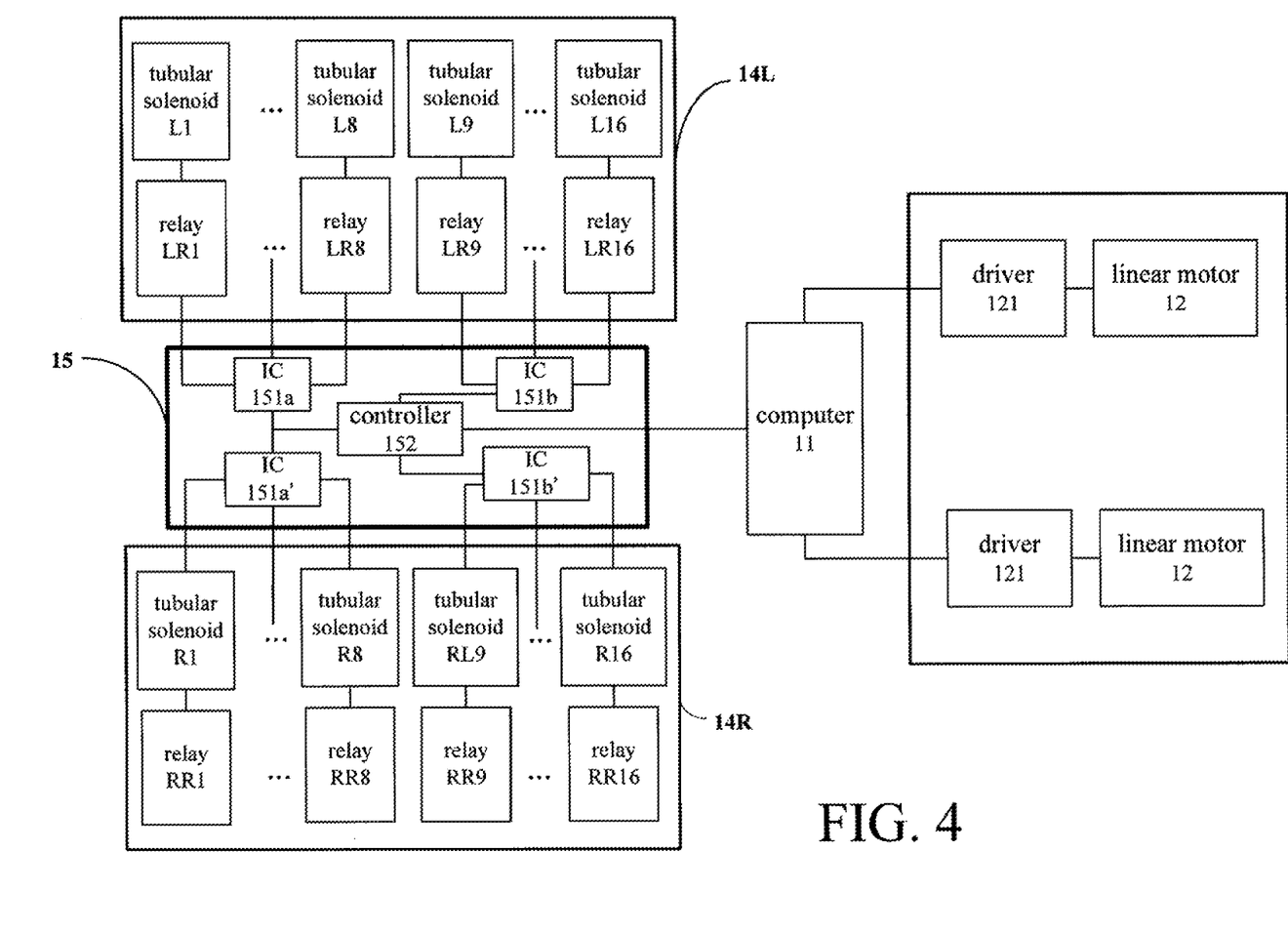
FIG. 4 is a schematic functional block diagram illustrating the robot system according to the present invention.

Next, please refer to FIG. 4, which illustrates the control circuit 15 of the present invention. The two finger-like devices 14L and 14R are substantially electrically coupled to the computer 11 via the control circuit 15. For example, when the computer 11 stored with a piano score, the computer 11 transmits the instructions of what should be played in the piano score to a controller 152 via a RS-232 interface. (The controller 152 may be, for example, the BS2 microprocessor.) Next, the controller 152 determines which IC (IC 152a-152b') controls the key that is going to be played and then drives a corresponding relay. The IC may be, for example, a SN74HC595 chip. The computer 11 controls two linear motors 12 via a driver 121 and obtains the present position and target position of the tubular solenoids L1-L16 and R1-R16. The tubular solenoids L1-L16 and R1-R16 are controlled for activation respectively via relays LR1-LR16 and RR1-RR16, and then the key(s) is/are pressed by the corresponding electromagnetic bar(s).

The present invention further provides a method for playing a chord by using the above chord-playing robot system. The method of the present invention can be performed by executing a playing program by a computer substantially. Please refer to FIG. 5. The method of the present invention comprises steps S1-S5, which are respectively illustrated in the following paragraphs.

Figure 5:
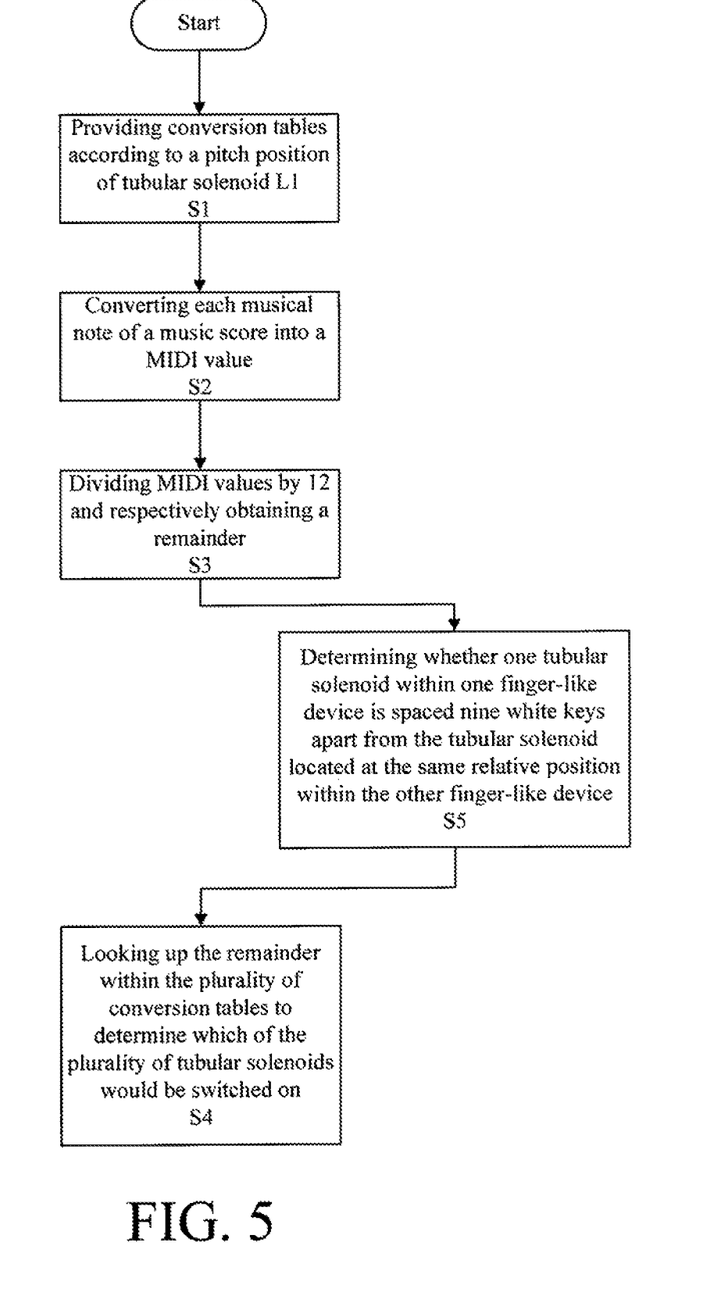
FIG. 5 is a flowchart presenting a method for controlling a chord-playing robot system according to the present invention.

Step S1: Provide a plurality of conversion tables according to a pitch position of one of the plurality of tubular solenoids.

For example, two linear motors 12 are respectively electronically coupled to the computer 11, whereby the position of each of the tubular solenoids L1-L16 and R1-R16 can be obtained. The following description respectively lists seven conversion tables (Tables 1-7) using an example of the tubular solenoid of No. L9 located at pitch positions C, D, E, F, G, A, and B, respectively.

Step S2: Convert each musical note of a music score into a corresponding value of Musical Instrument Digital Interface (MIDI) respectively.

Musical Instrument Digital Interface (MIDI) is an industry-standard electrical communication protocol. The MIDI defines all kinds of musical notes or playing codes for music devices such as electronic instruments (e.g., an electronic piano). Because the technique of MIDI is well known to those of reasonable skill in the art, the detailed description for doing so is omitted.

For example, the tubular solenoid L9 at the position of key C5 is defined in Step 1. If it needs to simultaneously press the keys of E5, G#5, and B5, the MIDI values of E5, G#5, and B5 are respectively 64, 68, and 71, which can be converted by the computer.

Step S3: Divide the MIDI values by 12 and respectively obtain a remainder.

The MIDI values of E5, G#5, and B5 of the above example are respectively divided by 12, so the respective remainders, 4, 8, and 11, can be obtained.

Step S4: Look up the remainder within the plurality of conversion tables to determine which of the plurality of tubular solenoids would be activated or switched on.

In the above example, it can be obtained through Conversion Table 1 that the corresponding instruction codes of the tubular solenoid are 0×04, 0×10, and 0×40. The instructions are combined through "OR" of logic to obtain the following codes:

Left_f=0×10

Left_r=0×04|0×40=0×44

According to the results of the above codes, it can be obtained from referring to Table 1 that the tubular solenoids of No. L5, L11, and L15 will be instructed to perform the movement of press. At this step, a control instruction is formed according to the other two ICs, and the BS2 microprocessor is used to execute the instruction of the movement of press.

It should be noted that the steps of the method of the present invention do not have to be in the order mentioned above. For example, step S2 of converting each musical note of a music score into a corresponding MIDI value can also be performed first.

The following seven conversion tables (tables 1-7) are listed according to an example of the tubular solenoid No. L9 located at pitch positions C, D, E, F, G, A, and B, respectively.

TABLE 1

The conversion table when tubular solenoid L9 is located at pitch "C"

| | Tubular solenoid | | | | | | | |
|---|---|---|---|---|---|---|---|---|
| | L1 | L2 | L3 | L4 | L5 | L6 | L7 | L8 |
| Pitch | C# | D# | | F# | G# | A# | | |
| Remainder | 1 | 3 | | 6 | 8 | 10 | | |
| Instruction | 0X01 | 0X02 | | X08 | 0X10 | 0X20 | | |

| | Tubular solenoid | | | | | | | |
|---|---|---|---|---|---|---|---|---|
| | L9 | L10 | L11 | L12 | L13 | L14 | L15 | L16 |
| Pitch | C | D | E | F | G | A | B | |
| Remainder | 0 | 2 | 4 | 5 | 7 | 9 | 11 | |
| Instruction | 0X01 | 0X02 | 0X04 | 0X08 | 0X10 | 0X20 | 0X40 | |

TABLE 2

The conversion table when tubular solenoid L9 is located at pitch "D"

| | Tubular solenoid | | | | | | | |
|---|---|---|---|---|---|---|---|---|
| | L1 | L2 | L3 | L4 | L5 | L6 | L7 | L8 |
| Pitch | D# | | F# | G# | A# | | C# | |
| Remainder | 3 | | 6 | 8 | 10 | | 1 | |
| Instruction | 0X01 | | 0X04 | X08 | 0X10 | | 0X40 | |

| | Tubular solenoid | | | | | | | |
|---|---|---|---|---|---|---|---|---|
| | L9 | L10 | L11 | L12 | L13 | L14 | L15 | L16 |
| Pitch | D | E | F | G | A | B | C | |
| Remainder | 2 | 4 | 5 | 7 | 9 | 11 | 0 | |
| Instruction | 0X01 | 0X02 | 0X04 | 0X08 | 0X10 | 0X20 | 0X40 | |

TABLE 3

The conversion table when tubular solenoid L9 is located at pitch "E"

| | Tubular solenoid | | | | | | | |
|---|---|---|---|---|---|---|---|---|
| | L1 | L2 | L3 | L4 | L5 | L6 | L7 | L8 |
| Pitch | | F# | G# | A# | | C# | D# | |
| Remainder | | 6 | 8 | 10 | | 1 | 3 | |
| Instruction | | 0X02 | 0X04 | X08 | | 0X20 | 0X40 | |

| | Tubular solenoid | | | | | | | |
|---|---|---|---|---|---|---|---|---|
| | L9 | L10 | L11 | L12 | L13 | L14 | L15 | L16 |
| Pitch | E | F | G | A | B | C | D | |
| Remainder | 4 | 5 | 7 | 9 | 11 | 0 | 2 | |
| Instruction | 0X01 | 0X02 | 0X04 | 0X08 | 0X10 | 0X20 | 0X40 | |

TABLE 4

The conversion table when tubular solenoid L9 is located at pitch "F"

| | Tubular solenoid | | | | | | | |
|---|---|---|---|---|---|---|---|---|
| | L1 | L2 | L3 | L4 | L5 | L6 | L7 | L8 |
| Pitch | F# | G# | A# | | | C# | D# | |
| Remainder | 6 | 8 | 10 | | | 1 | 3 | |
| Instruction | 0X01 | 0X02 | 0X04 | | | 0X10 | 0X20 | |

| | Tubular solenoid | | | | | | | |
|---|---|---|---|---|---|---|---|---|
| | L9 | L10 | L11 | L12 | L13 | L14 | L15 | L16 |
| Pitch | F | G | A | B | C | D | E | |
| Remainder | 5 | 7 | 9 | 11 | 0 | 2 | 4 | |
| Instruction | 0X01 | 0X02 | 0X04 | 0X08 | 0X10 | 0X20 | 0X40 | |

TABLE 5

The conversion table when tubular solenoid L9 is located at pitch "G"

| Tubular solenoid | L1 | L2 | L3 | L4 | L5 | L6 | L7 | L8 |
|---|---|---|---|---|---|---|---|---|
| Pitch | G# | A# |  | C# | D# |  | F# |  |
| Remainder | 6 | 8 |  | 1 | 3 |  | 6 |  |
| Instruction | 0X01 | 0X02 |  | 0X08 | 0X10 |  | 0X40 |  |

| Tubular solenoid | L9 | L10 | L11 | L12 | L13 | L14 | L15 | L16 |
|---|---|---|---|---|---|---|---|---|
| Pitch | G | A | B | C | D | E | F |  |
| Remainder | 7 | 9 | 11 | 0 | 2 | 4 | 5 |  |
| Instruction | 0X01 | 0X02 | 0X04 | 0X08 | 0X10 | 0X20 | 0X40 |  |

TABLE 6

The conversion table when tubular solenoid L9 is located at pitch "A"

| Tubular solenoid | L1 | L2 | L3 | L4 | L5 | L6 | L7 | L8 |
|---|---|---|---|---|---|---|---|---|
| Pitch | A# |  | C# | D# |  | F# | G# |  |
| Remainder | 8 |  | 1 | 3 |  | 6 | 8 |  |
| Instruction | 0X01 |  | 0X04 | 0X08 |  | 0X20 | 0X40 |  |

| Tubular solenoid | L9 | L10 | L11 | L12 | L13 | L14 | L15 | L16 |
|---|---|---|---|---|---|---|---|---|
| Pitch | A | B | C | D | E | F | G |  |
| Remainder | 9 | 11 | 0 | 2 | 4 | 5 | 7 |  |
| Instruction | 0X01 | 0X02 | 0X04 | 0X08 | 0X10 | 0X20 | 0X40 |  |

TABLE 7

The conversion table when tubular solenoid L9 is located at pitch "B"

| Tubular solenoid | L1 | L2 | L3 | L4 | L5 | L6 | L7 | L8 |
|---|---|---|---|---|---|---|---|---|
| Pitch |  | C# | D# |  | F# | G# | A# |  |
| Remainder |  | 1 | 3 |  | 6 | 8 | 10 |  |
| Instruction |  | 0X02 | 0X04 |  | 0X10 | 0X20 | 0X40 |  |

| Tubular solenoid | L9 | L10 | L11 | L12 | L13 | L14 | L15 | L16 |
|---|---|---|---|---|---|---|---|---|
| Pitch | B | C | D | E | F | G | A |  |
| Remainder | 11 | 0 | 2 | 4 | 5 | 7 | 9 |  |
| Instruction | 0X01 | 0X02 | 0X04 | 0X08 | 0X10 | 0X20 | 0X40 |  |

In addition, in order to prevent collisions, the present invention designs a mechanism for preventing collisions. Therefore, preferably, the present invention may also perform the following step before step S4 by using the computer to execute an anti-collision program:

Step S5: Determine whether one tubular solenoid within one finger-like device is spaced nine white keys apart from the tubular solenoid located at the same relative position within the other finger-like device.

For example, in the above chord-playing robot system 1, the computer 11 is utilized to execute the anti-collision program to perform the determination in step S5. In detail, the shortest distance between tubular solenoids L9 and R9 is nine keys in a situation in which the left and right linear motors 12 do not collide with each other. Thus when the linear motors 12 are going to move, the following determination is performed (take the left linear motor for example):

```
Definition: last_posi_L; /* the present position of the left linear motor*/
    last_posi_R; /* the present position of the right linear motor*/
    goal_posi_L; /* the target position of the left linear motor*/
    goal_posi_R; /* the target position of the right linear motor*/
    if( | goal_posi_L-last_posi_R | ≥9)
    {
    move to goal_posi_L;
    last_posi_L ← goal_posi_L;
    }
    else
    {
    goal_posi_L ← last_posi_R-9;
    move to goal_posi_L;
    last_posi_L ← goal_posi_L;
    }
```

Thus, the collision between the left side and the right side can be prevented. Therefore, the system of the present invention will be simplified and has complete functions. It simply uses two linear motors 12 and tubular solenoids L1-L16, R1-R16 to meet the requirement of playing the piano. Moreover, the principle of the operation of tubular solenoids is very easy. The precision of displacement of the linear motors is very high, and the actual operation is quite easy and reliable. Furthermore, the mechanism for preventing collisions can indeed work, and there were no collisions during experimental testing. Finally, according to the results of the experiments, chords in the same octave can be played simultaneously and correctly by dealing with chord playing by way of instruction codes.

The present invention has complete functions. In addition, compared with a playing system with multidimensional robot fingers and arms, the cost of the present invention is relatively low. Moreover, the present invention is easy to maintain and operate. Thus, the system and the method of the present invention effectively solve current problems of playing piano.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A chord-playing robot system, comprising:
   a computer, comprising an anti-collision program stored therein;
   two linear motors electrically coupled to and controlled by the computer;
   two moving devices respectively connected with the two linear motors, wherein the two linear motors are operable to control the position of the two moving devices, and the anti-collision program, upon execution, is operable to prevent the two moving devices from colliding with each other; and
   two finger-like devices electrically coupled to and controlled by the computer, wherein each of the two finger-like devices is connected with one of the two moving devices and comprises:

a plurality of tubular solenoids disposed in alternating sequence in two rows, wherein each of the tubular solenoids, upon activating, is operable to create an induced electromagnetic force, wherein the computer determines whether to activate each of the tubular solenoids or not; and a plurality of electromagnetic bars, each configured to reciprocate between a first position for pressing a key on a piano in the presence of the induced electromagnetic force and a second position for releasing the key on the piano in the absence of the induced electromagnetic force, and whereby the robot system plays a chord on the piano.

2. The robot system as claimed in claim 1, wherein each of the finger-like devices comprises sixteen tubular solenoids that are disposed in alternating sequence in two rows such that each of the two rows has eight tubular solenoids.

3. The robot system as claimed in claim 1 further comprising a plurality of relays configured to respectively control the on/off of each of the plurality of tubular solenoids.

4. The robot system as claimed in claim 1 further comprising a control circuit, wherein the two finger-like devices are electrically coupled to the computer via the control circuit.

5. The robot system as claimed in claim 1, wherein one of the finger-like devices plays a main melody of a musical piece, the other finger-like device plays a second melody or chords of the musical piece.

6. The robot system as claimed in claim 1, wherein the computer further comprises a playing program to perform the following steps:

providing a plurality of conversion tables based on a pitch position corresponding to one of the plurality of tubular solenoids s;

converting each musical note of a music score into a corresponding value of Musical Instrument Digital Interface respectively;

dividing each of the MIDI values by 12 to obtain a remainder thereof; and looking up the remainder within the plurality of conversion tables to determine which of the plurality of tubular solenoids would be activated.

7. The robot system as claimed in claim 6, wherein the anti-collision program further performs the following steps:

determining whether one tubular solenoid within one finger-like device is spaced nine white keys apart from the tubular solenoid located at the same relative position within the other finger-like device.

* * * * *